(12) United States Patent
Dubey et al.

(10) Patent No.: US 8,007,044 B1
(45) Date of Patent: Aug. 30, 2011

(54) MOTHER'S HAND HEADREST

(75) Inventors: Megha Dubey, Germantown, MD (US);
Neelesh K Sharma, Germantown, MD (US)

(73) Assignee: Megha Dubey, Clarksburg, MD (US)

( * ) Notice: Subject to any disclaimer, the term of this patent is extended or adjusted under 35 U.S.C. 154(b) by 0 days.

(21) Appl. No.: 12/180,517

(22) Filed: Jul. 26, 2008

Related U.S. Application Data

(60) Provisional application No. 60/952,237, filed on Jul. 26, 2007.

(51) Int. Cl.
*A47C 7/36* (2006.01)
(52) U.S. Cl. ........................................................ 297/392
(58) Field of Classification Search ................... 297/392
See application file for complete search history.

(56) References Cited

U.S. PATENT DOCUMENTS

| | | | | | |
|---|---|---|---|---|---|
| 3,285,658 | A | * | 11/1966 | Cleveland | 297/395 |
| 4,197,604 | A | * | 4/1980 | Nakamura | 5/640 |
| D279,727 | S | * | 7/1985 | Mitchell | D2/508 |
| 4,776,049 | A | * | 10/1988 | Perron | 5/640 |
| 4,790,042 | A | * | 12/1988 | Reich | 5/655 |
| D370,585 | S | * | 6/1996 | Faithfull | D6/599 |
| D395,781 | S | * | 7/1998 | Golder | D6/599 |
| 6,116,691 | A | * | 9/2000 | Reece | 297/392 |
| 6,523,901 | B2 | * | 2/2003 | Smith | 297/392 |
| 6,641,221 | B1 | * | 11/2003 | Kastlunger | 297/397 |

* cited by examiner

*Primary Examiner* — David Dunn
*Assistant Examiner* — Philip Gabler

(57) ABSTRACT

A headrest for baby to be used in baby seats and car seats is disclosed. The headrest includes two conjoined soft hands which are joined to the wrist at some angle to form wide U or boat shape. The head of the baby rest into the soft conjoined hands and the chin resting on the middle/center joining part of the hands of the headrest stopping the unwanted forward movement of the head. Cheeks and temples of the baby rests on palm and fingers of the hands which stop unwanted side to side movement of the head Headrest has straps attached at the outer layer/back side of the conjoined hand and strap's other end is attached to the baby seat with the fastening system to hold the headrest in position.

8 Claims, 5 Drawing Sheets

MOTHER'S HAND HEADREST

CROSS-REFERENCE TO RELATED APPLICATIONS

This application claims the benefits of U.S. provisional patent application Ser. No. 60/952,237 filed on 2007 Jul. 26 by the present inventor.

FEDERALLY SPONSORED RESEARCH

Not Applicable

SEQUENCE LISTING OR PROGRAM

Not Applicable

BACKGROUND

1. Field of Invention

The present invention relates generally to the field of headrests and particularly to a child's headrest to fit onto car seat/baby seat/stroller or any other baby gear to provide stability from undesired side to side and forward movement of a child's head.

2. Prior Art

Most headrest include thick cushioning and fit around the chin, neck or/and head which makes child to feel uncomfortable, suffocated and tied up. Most of these headrests rests on child's shoulder and allow forward motion. Also the headrest those rests on child's shoulder are provided with the fastening system that irritates child's neck and back. While the headrest does provide comfort and support, they still allow possible unwanted movement. In particular, for children in car seats and baby seats, the undesired side to side and forward motion can put strain on the child's still-developing neck, shoulders and back. Backward motion is generally prevented by the rear of the seat. But the remaining unwanted motion like forward motion is not prevented by current headrests. Advantages and novelty of the Mother's Hand headrest is that it does not wrap around the neck and head so that baby will not feel uncomfortable, suffocated and tied up. The headrest gives sufficient space on both the sides of the head but do prevent side to side movement of the head. The forward motion of the head is controlled by the center part of the headrest where chin of the baby rests. Headrest do provide actual/real mother's hand comfort and support for baby in baby seat/car seat and stop forward and side to side motion.

The main idea of the headrest derived from the natural human habit of giving rest/support to the head with both hands (while resting and sleeping in sitting position) by keeping their joined hands under the chin and around the cheeks and temple (making wide U shape). In this position the temples and cheeks rest on fingers and palm of the hands and the chin rests in the center middle/center joint of the two hands. Elbows of the hand resting on the thighs or on any object to give head stability to rest, sleep/nap. In this invention elbows support is replaced by the headrest's fastening system to connect to seat Marbutt, sherri in U.S. Pat. No. 6,758,526 (2001) shows a headrest consist of substantially planar base pad having side cushions are adapted to be in open position and a closed position, generally a U-shaped when the apparatus is in a closed state, may not be effective because as the side cushions are attached to the base pad, it may not provide the stiff support during forward motion. The installation of the headrest mentioned by, Marbutt, sherri in U.S. Pat. No. 6,758,526 (2001), do not look comfortable and easy as you have to disturb the child's sleep in order to install the base of the headrest and if we keep the headrest in the seat when the child is in non sleeping state, the side cushions of the headrest may be uncomfortable to child.

Advantage of the Mother's hand headrest is that it is very portable, easy to install on any car seat or baby seat. The headrest can be installed easily and quickly without disturbing the child's sleep, providing the real mother's hand comfort.

In conclusion, insofar as we are aware no sleeping headrest formerly developed that provide the comfort and support to head without the defect of undesired (forward and side to side) motion of the head, easy to install and it does not need to wrap around the neck or head.

SUMMARY OF THE INVENTION

In accordance with the present invention and the contemplated problems which have and continue to exist in this field, the present invention provides a headrest that keeps a child's head stable, preventing unwanted forward and side to side motion. The headrest is designed for comfort like head resting in the mother's hands, cheeks resting on the palm and finger's, giving support to the side of the head but still giving sufficient space for head, so users will not feel suffocated/tied up. The headrest is comfortable, compact, portable and easy to use.

The headrest consists of two conjoined hands (similar to human hands) which are joined to the wrist at certain angle to form the wide U-shape or boat shape. The conjoined hands provide support to the cheeks and temples of the user in case of side to side movement. The middle/center joining part of the conjoined hands gives support to the chin of the user thus controlling the forward movement.

The center part of the headrest which connects the two hands is narrower (like the wrist of the human hand) than the palm of the hand.

The conjoined hands have straps fastened/sewed/stick on the outer layer i.e. back of the hands. The other end of the strap contains fastening system which is further attached to the fastening system provided at the front of the baby seat, car seat. The back side/outer layer of the conjoined hands where the strap is fastened/sewed/stick is provided with some decoration like cartoons characters, dolls, flowers etc.

This invention can also be used for adults with or without modification on any automobile seat (Car, train, airplanes etc.)

DETAILED DESCRIPTION OF THE INVENTION

Figure 1:
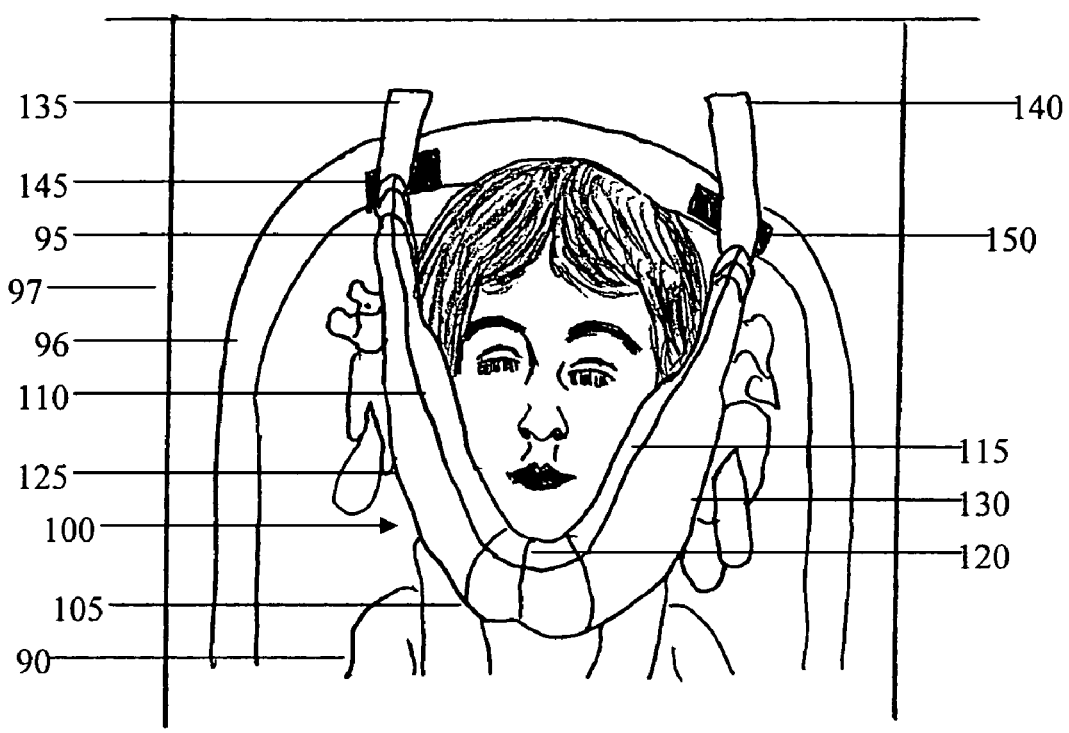
FIG. 1 illustrates a child whose head is supported by an embodiment of a mother's hand headrest.

The headrest can be constructed of a wide variety of materials. In a broad overview, this headrest can be made up of any cloth, fabric, plastic, vinyl, leather, foam, rubber, disposable spun bonded polypropylene, or any material or combination of materials to increase the comfort, support and/or the aesthetic appearance of the headrest. The filling of the headrest can be of any polyfill, foam, cotton, beads, beans, air, water gel, or any other material or combination of materials that is comfortable. Obviously the headrest can also be made strapless by providing other fastening system which may give strength to hold the conjoined hands in place, against the head weight and force of head motion.

Of course the above mentioned headrest can be made in any appropriate shape such as without limitation animals, birds, vegetables, fruits, moon, boat etc.

In the following embodiments, specific details are described but it should be understood that variations and modifications may be made to this invention without departing from the spirit and scope of this invention and that the invention is not limited to the precise embodiments described herein.

In its preferred embodiments, headrest is of simple construction. The detailed drawings show the headrest, in its preferred embodiments, constructed of soft cloth and some soft material filling that is rigid enough to maintain its shape yet soft enough to be comfortable. (For travel purposes, an inflatable headrest that can deflate offers the space saving benefits. The inflatable headrest will have the same components and similar properties as the aforementioned polyfill when referring to its rigidity and softness and will function in the same manner but will vary slightly in construction, e.g. an inflatable bladder with or without baffles for adjustability and an air intake valve or valves).

REFERRING TO THE DRAWINGS

Referring to the drawings wherein like reference numerals designate corresponding parts throughout the several figures, FIG. 1 illustrates a child 90 whose head 95 is supported by an embodiment of a mother's hand headrest 100. The headrest 100 is adapted to be used with a baby seat 96 typically used with a car seat 97. One type of baby seat 96 and car seat 97 are shown. It is understood that the headrest 100 can be used with other types of car seats and baby seats/baby strollers/other baby gears.

Figure 2:
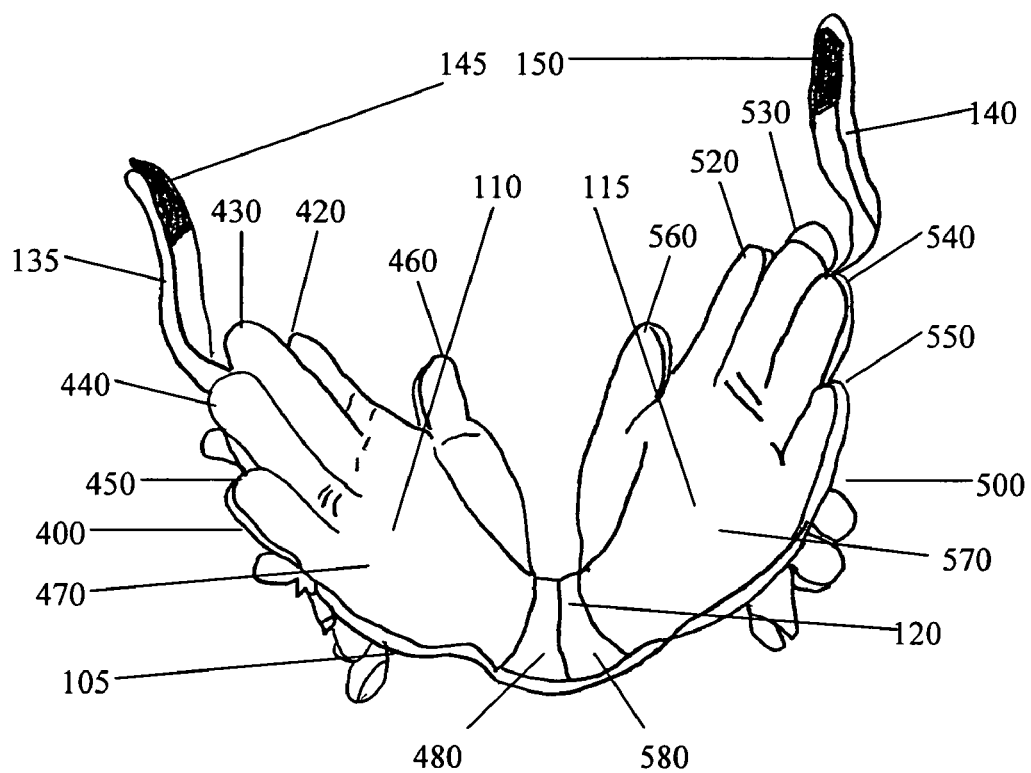
FIG. 2 Illustrates a Top view of an embodiment of a headrest.
Figure 3:
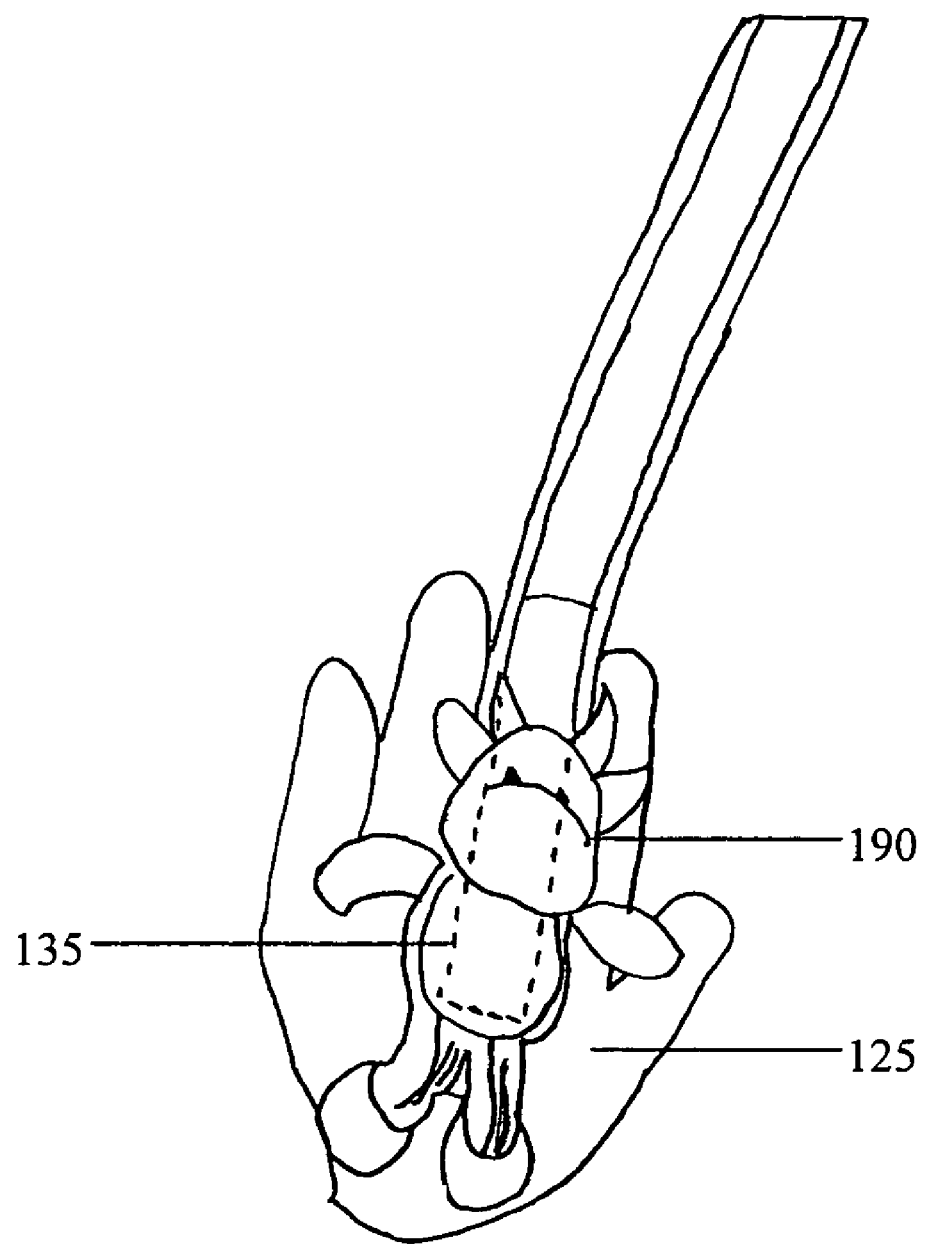
FIG. 3 Illustrate the side view of headrest showing strap attachment.

Headrest 100 includes conjoined hand 105, which is made up of layers of soft cloth (inner layer 110, 115 outer layer 125, 130) and having a cushioning material between the inner and outer layer of cloth, which is soft with rigidness. The inner layer 110, 115 (which is best shown in FIG. 2) of the conjoined hands 105 comes in the contact of child's cheeks and temples. The child's chin rests on the joining (center/middle) part 120 of the conjoined hands 105. The joining part 120 of the conjoined hand 105 is less wide than the conjoined hand 105, it's like a wrist of the two hands are joined. The strap 135,140 is stitched/stick to the outer/exterior layer 125, 130 of the conjoined hand 105 (the strap attachment is best shown in FIG. 3). The strap 135,140 is made up of soft material cloth. The other end of the straps 135,140 has fastening system that is 145,150 (which is best shown in the FIG. 3) to connect the strap to fastening system 170,175 (which is best shown in the FIG. 5) on the front of the baby seat 96 or car seat 97.

FIG. 2 illustrate the conjoined hand 105 consists of two hands 400, 500 are typically the shape of human hands are joined at certain angle. The hand 400 is having four fingers 420, 430, 440, 450, one thumb 460, palm 470 and the wrist 480. Similarly the hand 500 is having four fingers 520, 530, 540, 550, one thumb 560, palm 570 and the wrist 580. The wrist 480,580 are joined at certain angle, in such a way that it gives the comfort of real human hands supporting the user's head, this forms the center part where the chin of the child rest's.

FIG. 3 Illustrate the side view of the embodiment of a mother's hand headrest showing attachment of strap to the outer layer of one of the hands of conjoined hand 105 (conjoined hands is shown in FIG. 2). The strap 135 is stitched/sewed/fastened from the center of the outer layer 125 of one hands of the conjoined hand 105 towards the finger (covering the full length of finger) as shown in fig with dotted lines. A cartoon character 190 is stitched/sewed/stick over the strap which covers stitching of the strap 135 with the outer layer 125 of the conjoined hand 105. Similar cartoon character is stitched at the outer layer 130 of the conjoined hand 105.

Figure 4:
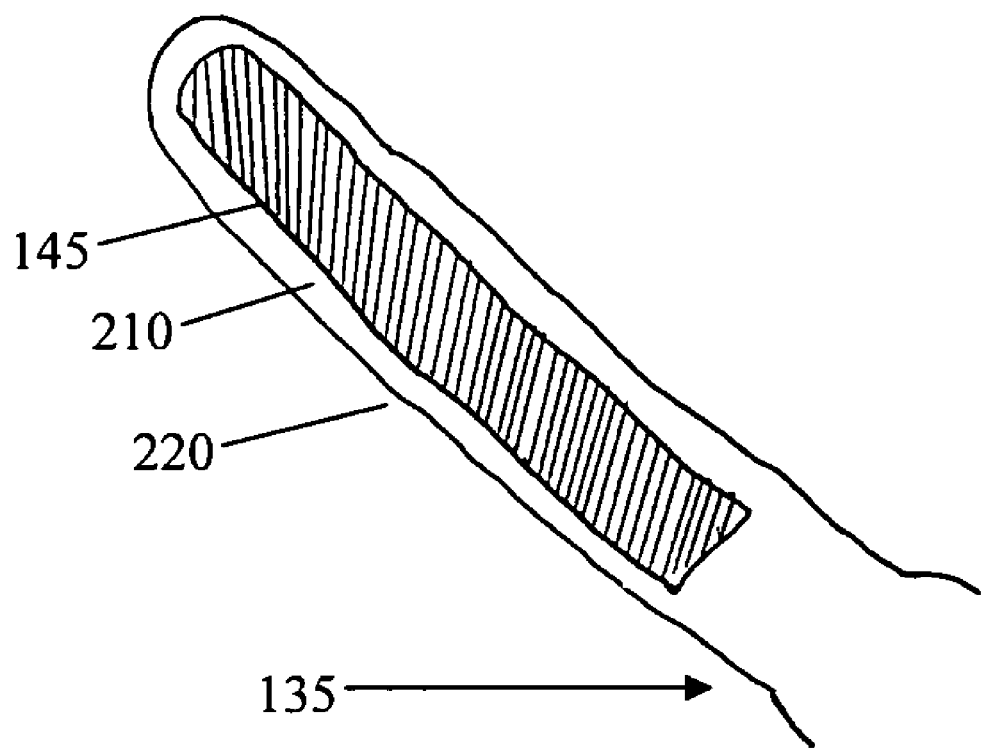
FIG. 4 illustrates strap.

FIG. 4 illustrates one of the straps of the headrest 100. The strap 135 which is attached to the back of conjoined hand 105 is shown in FIG. 3. The strap is made of soft cloth, have multiple layers (inner layer 210 and outer layer 220) sewed together to provide little strength to strap and is long enough to be adjusted according to child's comfortability. The one end of the strap 135 is attached to the conjoined hand as shown in FIG. 3 and the other end of the strap consist of some fastening system 145 such as Velcro. The fastening system 145 is stitched/sewd/sticked at the inner layer 210 of the strap 135. The length of the fastening system 145 on the strap is of sufficient length to adjust headrest vertically for comfortability. Another strap 140 is also provided with the similar fastening system 150 (not shown in Fig.).

Figure 5:
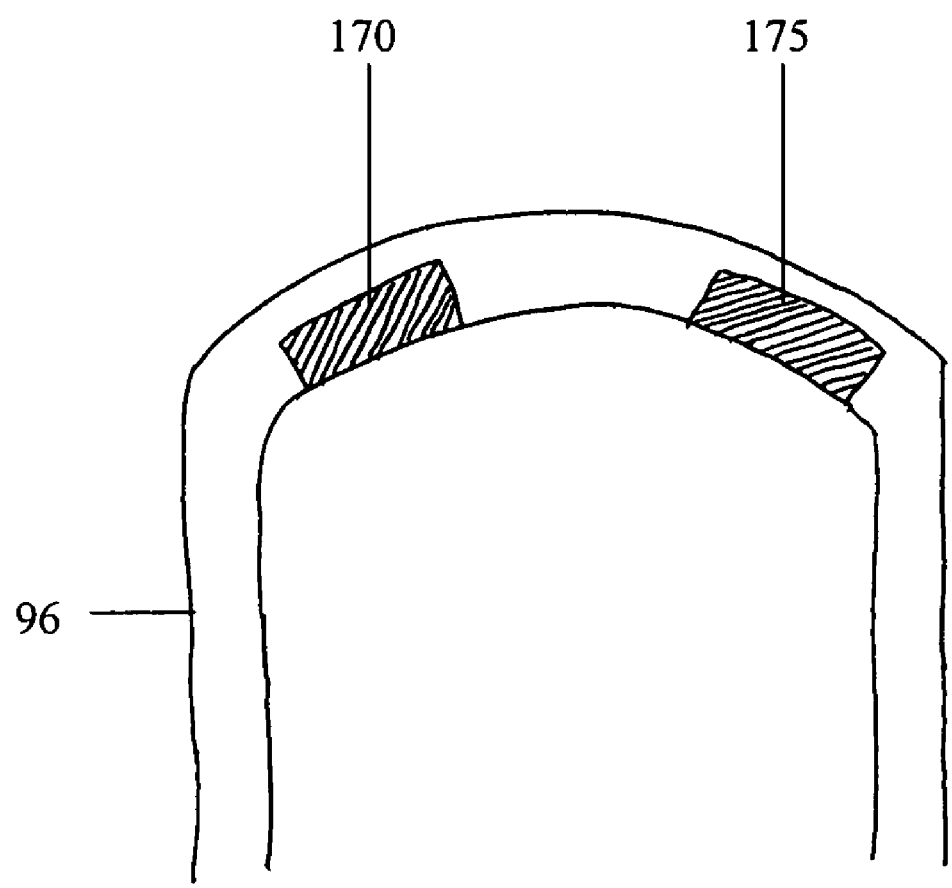
FIG. 5 Illustrates fastening system installed at the front of the baby seat.

FIG. 5 illustrates fastening system at the front of the baby seat 96. The fastening system 170, 175 such as Velcro is stick on the front of the baby seat 96. The fastening system 170, 175 is generally of rectangular in shape. The fastening system 170, 175 has enough width and length so that fastening system on the strap (shown in FIG. 4) can be easily adjusted horizontally according to child's comfortability. The fastening system 145,150 on straps 135,140 (shown in FIG. 3) get stick over the fastening system 170,175 at the time of use.

Operation: FIGS. 1, 2, 3, 4, 5

At the time of use the headrest 100 should be placed in such a way that the thumb 460,560 of the hands 400,500 should be towards the user, then following the child's sleeping position (direction in which head fall) the conjoined hand 105 is adjusted such that the chin of the child should rest's on the center part 120 of the headrest 100, then the fastening system 145,150 (at the end of the strap) are stick onto fastening system 170,175 on the front of the baby seat (the conjoined hand 105 will form the wide U-shape or boat shape). The fastening system 145,150 (at the end of the strap) or 170,175 (front of the baby seat or car seat) are adjustable so that it fits to different size and sleeping positions of the user. The conjoined hand 105 makes a wide u-shape or boat shape at the time of use. Fastening system 170, 175 such as Velcro is installed on the car sear 97 or baby seat 96 on both sides (left and right) of the baby head 95 and just above the baby head 95. The fastening system 170,175 is installed on car seat 97 or baby seat 96 only once before the use of the headrest 100, and it remain installed.

Headrest can be removed easily by pulling the headrest's straps 135,140.

It is to be understood by persons skilled in the art that even though reference is made to specific headrest, any variations of this invention which utilize the features described are to be considered part of this invention.

What is claimed is:

1. A one-piece headrest for securely holding the head of a person restrained in a seat having a seat back, said seat back having a front side, said front side having an upper portion, said upper portion of said front side having an integrally built-in or adhesively-attached elongated left positioning means on the left for securing a first end of the headrest with an adjustable length of a first fastener integrally attached to said first end of the headrest, and said front side of the upper portion of the seat back having an integrally built-in or adhesively attached elongated right positioning means on the right for securing a second end of the headrest with an adjustable length of a second fastener integrally attached to said second end of the headrest, wherein said headrest is of sufficient dimensions and designed to give support and comfort, during use, to said person's head, and to prevent significant lateral and forward movements of the head, and to protect the head from sudden forward and sideways movements due to any sudden impact, comprising: a single elongated body having an elongated first portion ending with said first end, a substantially equally elongated second portion ending with said second end, and a center portion narrower than and in between said first and second elongated portions, wherein said elongated first and second portions hold said narrow center portion; said single elongated body comprising a first flexible inner surface coming into contact with the person's head during use of said headrest, and a second flexible outer surface not in contact with the person's head during use, thereby forming a closed enclosure, and containing at least one cushion fill material retained within said enclosure; said first fastener having an elongated adhesive strip attached along its length, said first fastener being securely attached and disposed on said first end surface or along said elongated first portion at said second flexible outer surface, and extending beyond said elongated first portion of the headrest; said second fastener having an elongated adhesive strip attached along its length, said second fastener being securely attached and disposed on the second end surface or along said elongated second portion at said second flexible outer surface and extending beyond said elongated second portion of the headrest; said center portion positioned between said elongated first and second portions of said elongated body, constituting a narrow section in the middle of said headrest, said narrow section comprising a left cushioned digit-defining body flexibly and securely attached to the left side of said center portion on said first flexible inner surface, and a right cushioned digit-defining body flexibly and securely attached to the right side of said center portion on said first flexible inner surface, wherein said left and right digit-defining bodies face each other, and are attached to said first flexible inner surface of the headrest, and reasonably spaced apart so as to comfortably wrap around, securely hold, and accommodate the lower portion or substantially whole of the person's head between said left and right digit-defining bodies during use of the headrest.

2. A one-piece headrest as recited in claim 1, wherein said first flexible inner surface comes into contact with the person's head during use of said headrest, and said second flexible outer surface does not contact the person's head during use, and are made from materials selected from the group consisting of cloth, fabric, plastic, vinyl, leather, foam, rubber, disposable spun bonded polypropylene, or combinations thereof, and wherein said cushion fill material is selected from the group consisting of foam, cotton, beads, beans, air, water gel, or combinations thereof.

3. A one-piece headrest as recited in claim 1, wherein, decorative structures resembling an animal, a bird, a vegetable, a fruit, or moon are securely attached to said second flexible outer surface.

4. A one-piece headrest as recited in claim 1 wherein said headrest comprises said first and second fasteners, wherein
   a) said first fastener is securely attached and disposed on said first end or along said first elongated portion of the headrest at said second flexible outer surface beyond said first end of the headrest and is of sufficient length and width to permit horizontal and vertical adjustments of the headrest during its use to accommodate the head of the person securely;
   b) said second fastener is securely attached and disposed on second end or along said second elongated portion of the headrest at said second flexible outer surface beyond said second end of the headrest and is of sufficient length and width to permit horizontal and vertical adjustments of the headrest during its use to accommodate the head of the person securely.

5. A one-piece headrest as recited in claim 1, wherein the headrest can be securely used to restrain a child's head in an automobile seat, child restraining car-seat, or in a stroller, or to restrain an adult's head in a chair.

6. A one-piece headrest as recited in claim 1 wherein said first flexible inner surface coming into contact with the person's head during use of said headrest, and/or said second flexible outer surface individually contains imprints, images or drawings selected from the group consisting of cartoon characters, dolls, and flowers.

7. A one-piece headrest as recited in claim 1, wherein, during use, said first fastener extending beyond the first end of the said headrest is securely attached to said integrally built-in left positioning means on said seat back for securing said first end of the headrest, and said second fastener extending beyond the second end of said headrest is securely attached to said integrally built-in right positioning means on said seat back for securing the second end of the headrest, the lengths of said first and second fasteners being adjustable to hold the person's head in a comfortable position.

8. A one-piece headrest as recited in claim 1, wherein said left cushioned digit-defining body constitutes said elongated first portion of the headrest, and said right cushioned digit-defining body constitutes said elongated first portion of the headrest.

\* \* \* \* \*